US012601655B2

(12) United States Patent
Chang

(10) Patent No.: US 12,601,655 B2
(45) Date of Patent: Apr. 14, 2026

(54) RESOLUTION DETECTION DEVICE

(71) Applicant: VIVOTEK INC., New Taipei City (TW)

(72) Inventor: Chung-Kai Chang, New Taipei City (TW)

(73) Assignee: VIVOTEK INC., New Taipei City (TW)

( * ) Notice: Subject to any disclaimer, the term of this patent is extended or adjusted under 35 U.S.C. 154(b) by 111 days.

(21) Appl. No.: 18/736,543

(22) Filed: Jun. 7, 2024

(65) Prior Publication Data

US 2024/0410782 A1 Dec. 12, 2024

(30) Foreign Application Priority Data

Jun. 9, 2023 (TW) ................................. 112121592

(51) Int. Cl.
*G01M 11/02* (2006.01)
*H04N 17/00* (2006.01)

(52) U.S. Cl.
CPC ...... *G01M 11/0207* (2013.01); *H04N 17/002* (2013.01)

(58) Field of Classification Search
CPC ......................... G01M 11/0207; H04N 17/002
See application file for complete search history.

(56) References Cited

U.S. PATENT DOCUMENTS

| | | | |
|---|---|---|---|
| 11,283,978 B1 * | 3/2022 | Lee ......................... | H04N 23/55 |
| 2016/0373734 A1 * | 12/2016 | Cole .................... | H04N 13/232 |
| 2020/0293808 A1 * | 9/2020 | Miginnis ................ | G06V 10/25 |

* cited by examiner

*Primary Examiner* — Tarifur R Chowdhury
*Assistant Examiner* — Carlos Perez-Guzman
(74) *Attorney, Agent, or Firm* — Winston Hsu

(57) ABSTRACT

A resolution detection device is applied to a camera device and includes at least one arc-shaped structural member and an identification member. The at least one arc-shaped structural member is disposed on a position distant from a detection point in a predefined distance. The identification member includes a plurality of identification patterns. The identification member is formed on the at least one arc-shaped structural member, and a plurality of intervals between the detection point and each of the plurality of identification patterns is set as the predefined distance. The camera device acquires a captured image via the detection point, and the captured image contains the plurality of identification patterns. The resolution detection device further includes a relay lens disposed on the detection point.

16 Claims, 10 Drawing Sheets

RESOLUTION DETECTION DEVICE

BACKGROUND OF THE INVENTION

1. Field of the Invention

The present invention relates to a resolution detection device, and more particularly, to a resolution detection device with preferred identification efficiency and universally applicable to lenses with different fields of view.

2. Description of the Prior Art

With the advanced technology, the beneficial result of the conventional evaluation method of lens specification that is based on the human eye is unable to meet the current usage requirement. The developed evaluation method of lens specification has patterns with straight black and white boundaries, and the wide-angle lens is used to capture the black and white patterns to acquire an evaluation result of lens resolution via computation of the spatial frequency response. Distortion aberrations may be generated at edges of the patterns captured by the wide-angle lens, and the conventional evaluation method of lens specification utilizes the collimator lens to simulate the distant light source; however, a drawback of the conventional evaluation method of lens specification is that if the replaced lens to be tested has different visual ranges, the collimator lens has to be disassembled or adjusted or replaced, which results in high cost and inconvenient operation.

SUMMARY OF THE INVENTION

The present invention provides a resolution detection device with preferred identification efficiency and universally applicable to lenses with different fields of view for solving above drawbacks.

According to the claimed invention, a resolution detection device is applied to a camera device and includes at least one arc-shaped structural member and an identification member. Position of the at least one arc-shaped structural member reaches a predefined distance relative to a detection point. The identification member is formed on the at least one arc-shaped structural member and includes a plurality of identification patterns, and a plurality of intervals respectively between the plurality of identification patterns and the detection point is equal to the predefined distance. The camera device acquires a captured image through the detection point, and the captured image contains at least parts of the plurality of identification patterns. The camera device further includes a relay lens disposed on the detection point.

When the camera lens needs to focus at the close distance or the long range for computing the lens resolution, the present invention can utilize the identification member and the identification patterns with the arc-shaped structural member of the resolution detection device to acquire the correct lens resolution, and further can simulate the environment of the required object distance via the relay lens and the backlight plate. Moreover, the arc-shaped structural member can be made by flexible transparent material, and can be bent to the related arc shape in accordance with the optical parameters of the relay lens, so as to ensure the intervals between all sections of the arc-shaped structural member and the relay lens are the same and equal to the predefined distance, and further to eliminate the distortion error and prevent the boundary of the identification pattern from bending or deformed compression, for computation of the correct lens resolution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
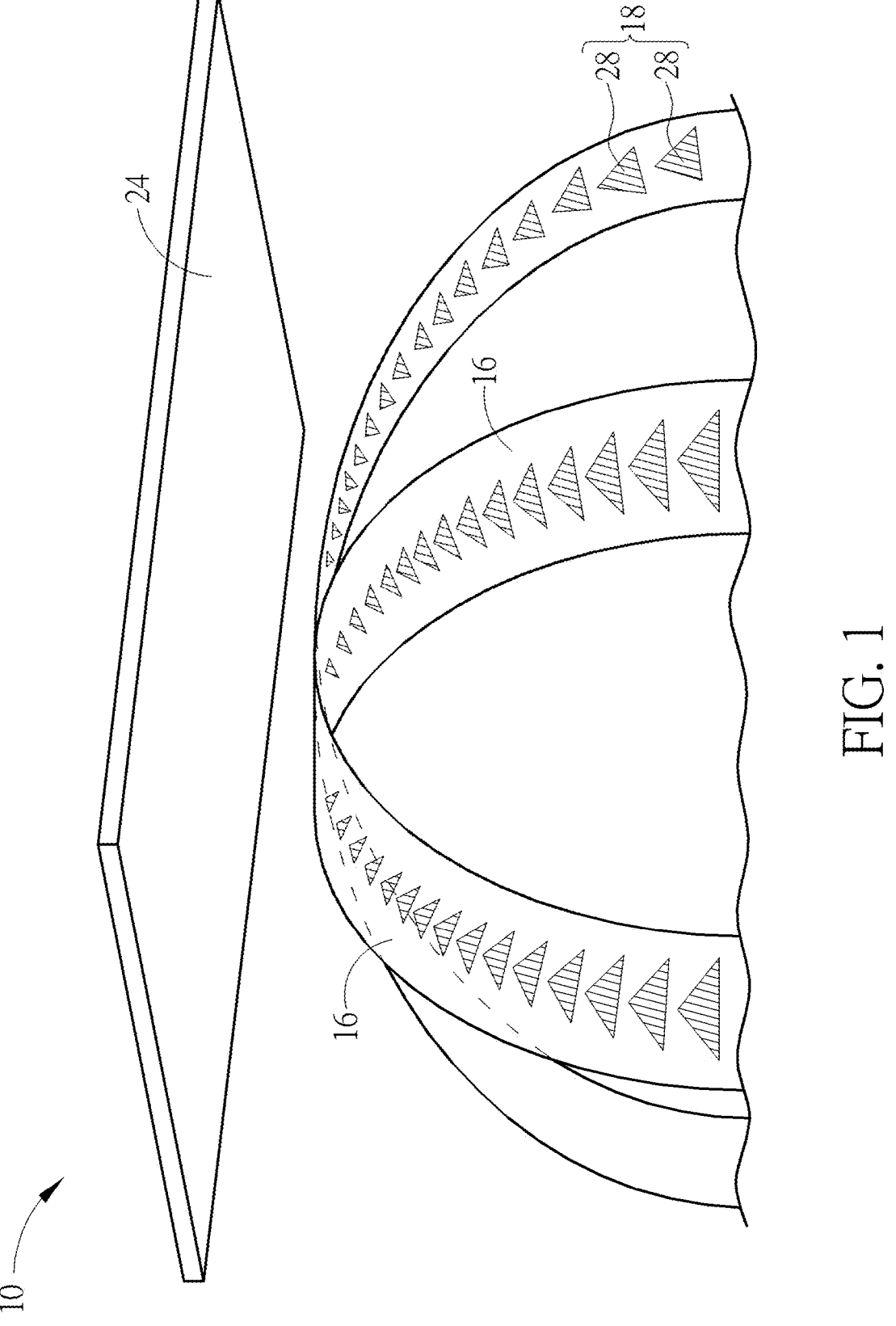
FIG. 1 is a diagram of a resolution detection device according to an embodiment of the present invention.
Figure 2:
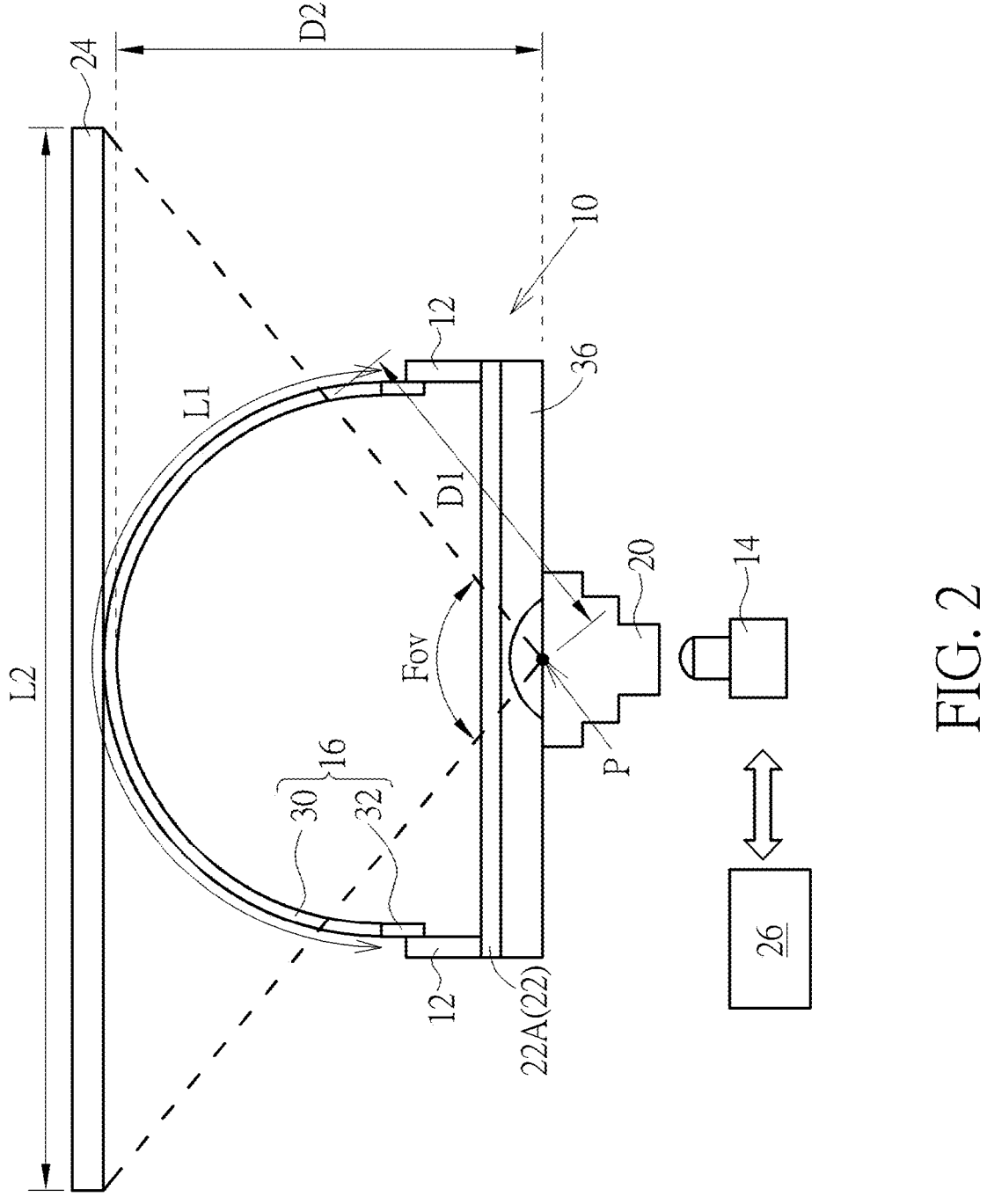
FIG. 2 is a sectional view of the resolution detection device according to the embodiment of the present invention.
Figure 3:
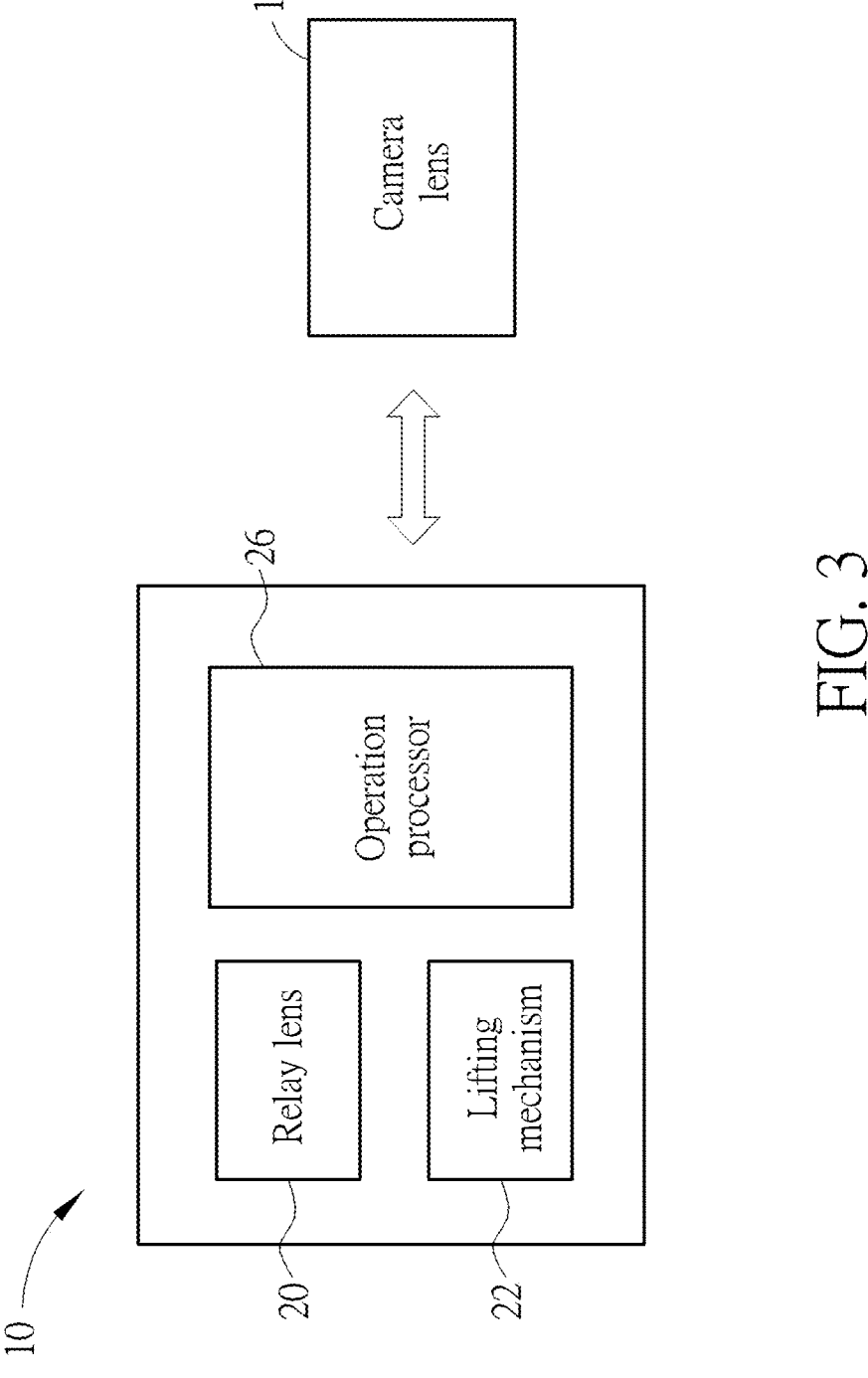
FIG. 3 is a functional block diagram of the resolution detection device according to the embodiment of the present invention.
Figure 4:
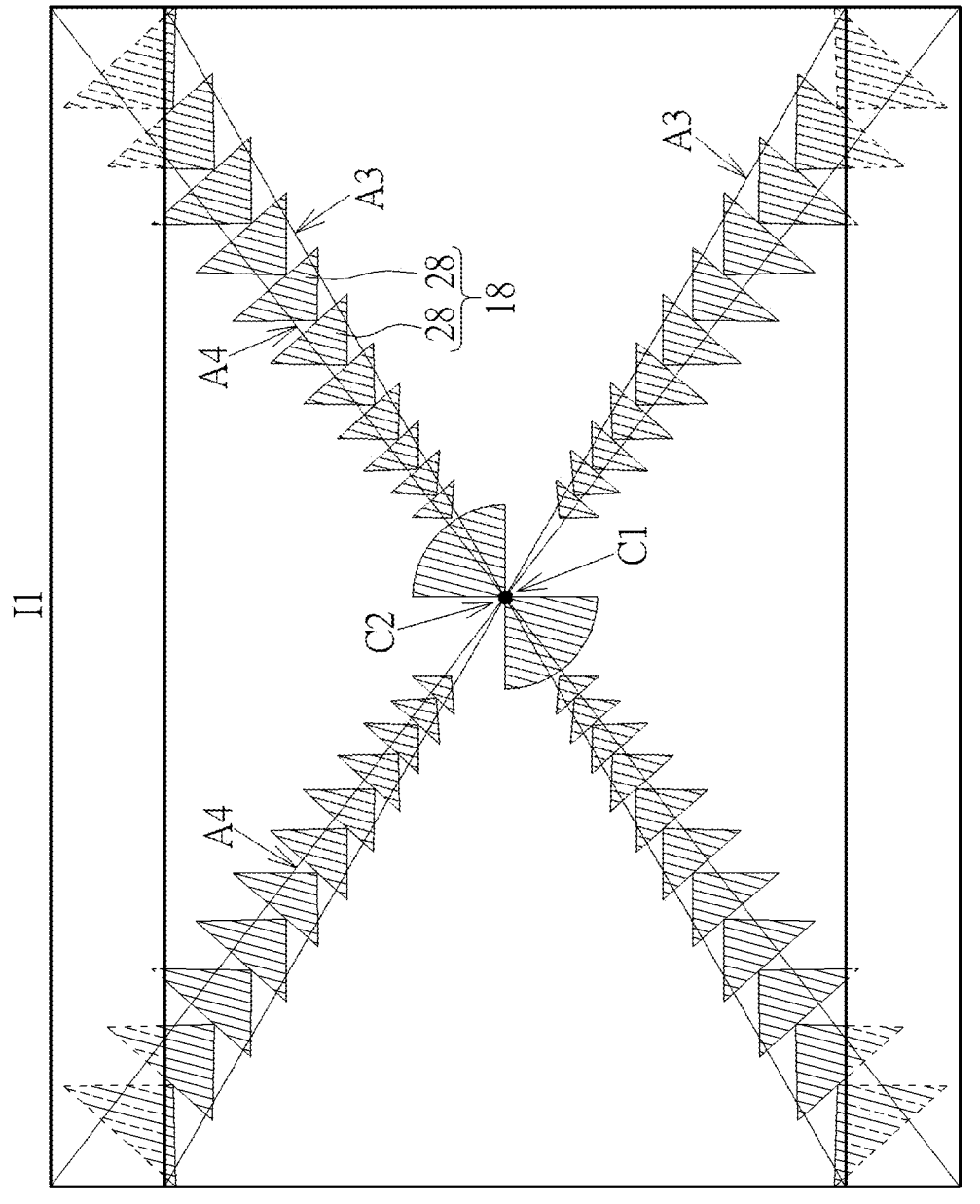
FIG. 4 is a diagram of a captured image acquired by the resolution detection device according to the embodiment of the present invention.
Figure 8:
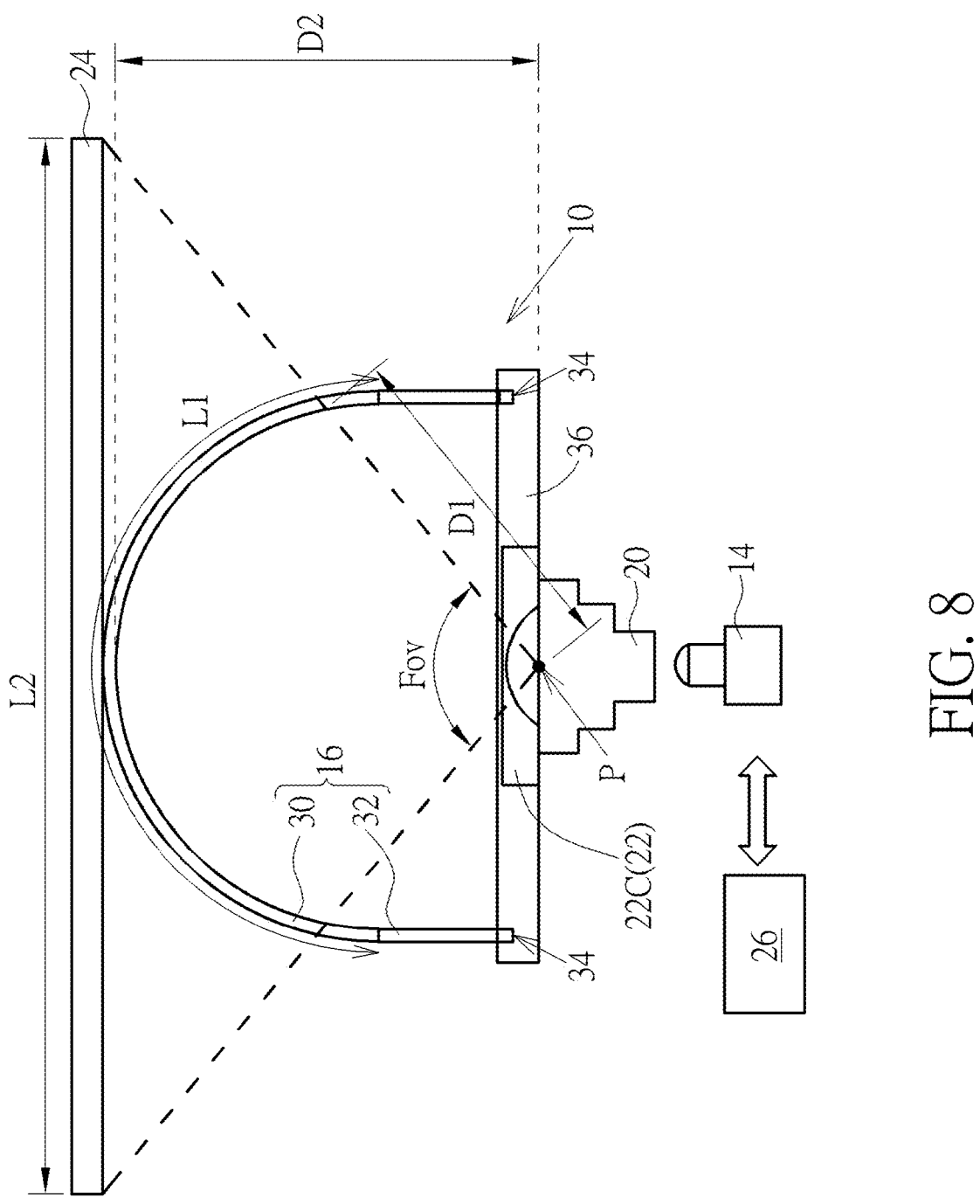
FIG. 8 to FIG. 10 are sectional views of the resolution detection device according to other embodiments of the present invention.
Figure 9:
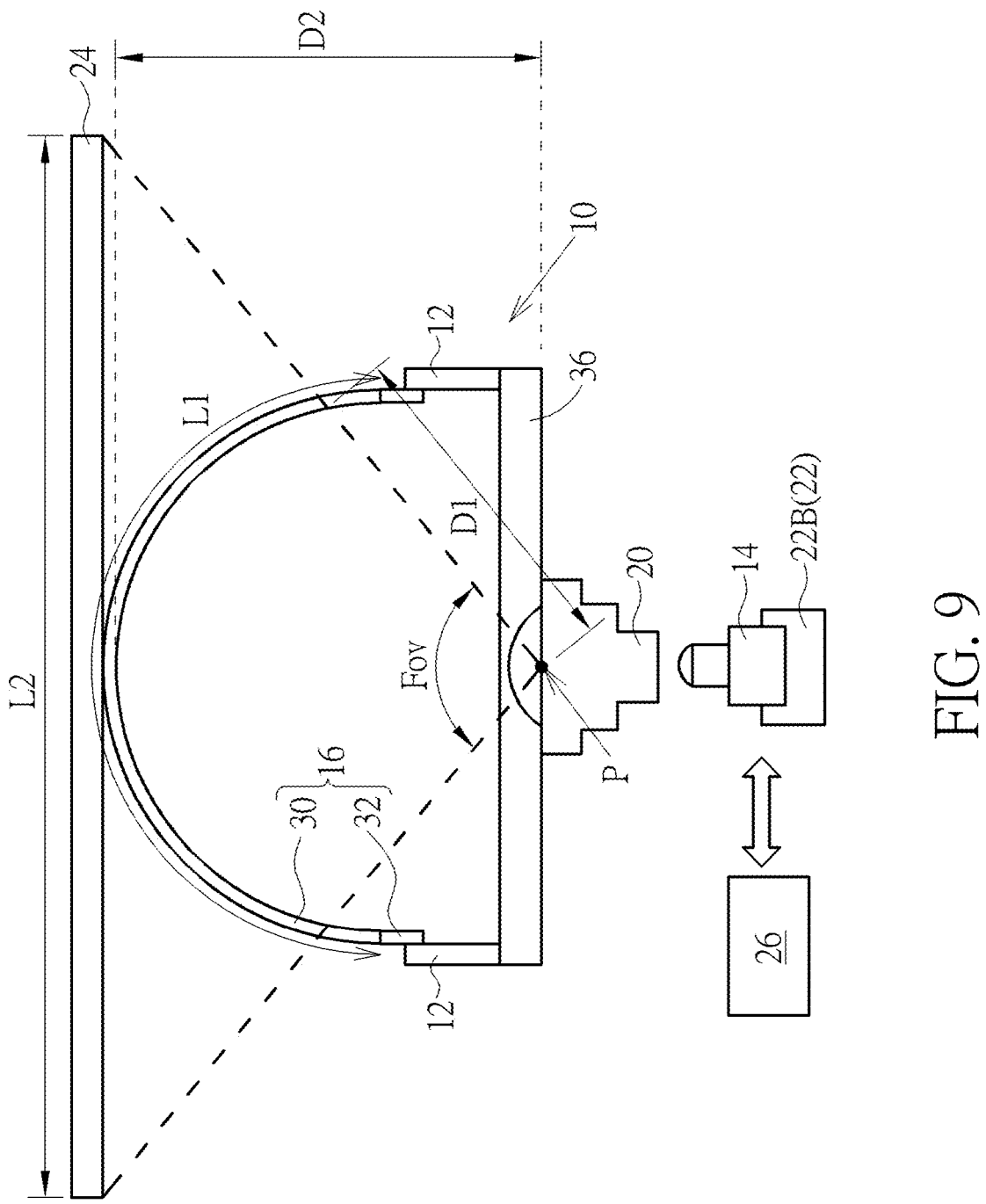
Figure 10:
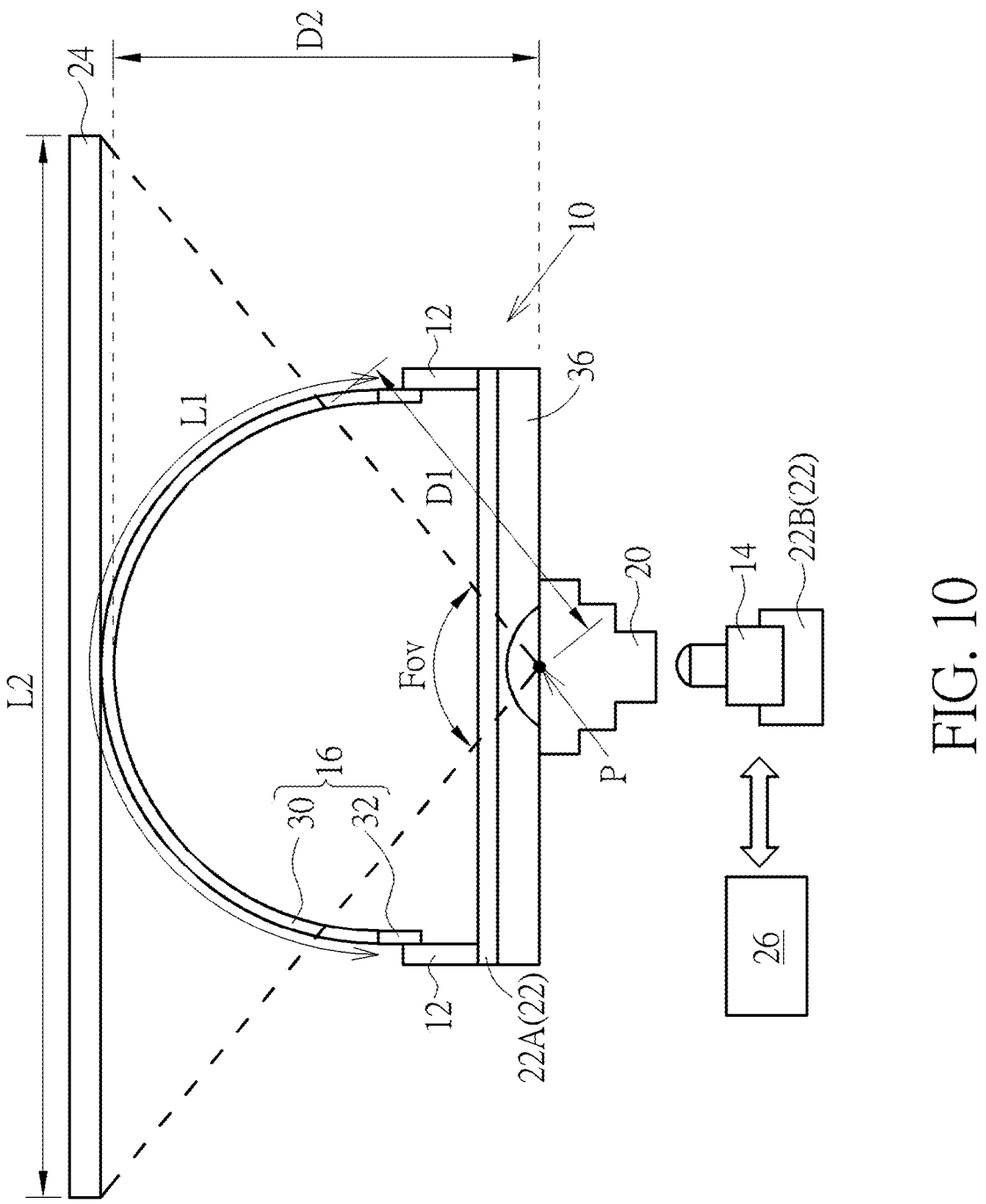

Please refer to FIG. 1 to FIG. 4 and FIG. 8 and FIG. 10. FIG. 1 is a diagram of a resolution detection device 10 according to an embodiment of the present invention. FIG. 2 is a sectional view of the resolution detection device 10 according to the embodiment of the present invention. FIG. 3 is a functional block diagram of the resolution detection device 10 according to the embodiment of the present invention. FIG. 4 is a diagram of a captured image I1 acquired by the resolution detection device 10 according to the embodiment of the present invention. FIG. 8 to FIG. 10 are sectional views of the resolution detection device 10 according to other embodiments of the present invention. The resolution detection device 10 can be optionally disposed on a holder 12, and applied to a camera lens 14 for detecting and acquiring lens resolution correctly. In addition, the resolution detection device 10 can be optionally applied to any optical element with a teleconverter, so as to simulate an infinite collimated light source within the limited space, and to take an advantage of lower hardware cost to perform detection of spatial resolution. In one embodiment, the resolution mentioned in the present invention can be defined as the spatial resolution.

The resolution detection device 10 can include an arc-shaped structural member 16, an identification member 18, a relay lens 20, a lifting mechanism 22, a backlight plate 24 and an operation processor 26. The arc-shaped structural member 16 can be disposed on the holder 12, and can reach a predefined distance D1 relative to a detection point P. An actual value and a related allowable tolerance scope of the predefined distance D1 can be adjusted in accordance with a field of view of the camera lens 14. For example, the allowable tolerance scope of the predefined distance D1 can be twenty percent. The identification member 18 can be, but not limited to, formed on the arc-shaped structural member 16 in an adhesive manner, in a laser engraving manner or in a laser printing manner. The identification member 18 can include a plurality of identification patterns 28 arranged in a non-overlapped manner or in a partly overlapped manner. The operation processor 26 can detect the identification patterns 28 via related algorithms in accordance with the non-overlapped manner or the partly overlapped manner of the identification patterns 28. A plurality of intervals of the plurality of identification patterns 28 relative to the detection point P can respectively conform to the predefined distance D1. Therefore, the detection point P can be a center of a virtual sphere, and the arc-shaped structural member 16 can correspond to a partial surface of the virtual sphere, and the foresaid interval or the predefined distance D1 can be defined as a radius of the virtual sphere.

In the embodiment of the present invention, the resolution detection device 10 can constrain a bending state of the arc-shaped structural member 16 by the holder 12; if the arc-shaped structural member 16 has been formed in the required bending state, the holder 12 is unnecessary, and two ends of the arc-shaped structural member 16 can be positioned on an upper surface of a base 36 where on the lifting mechanism 22 is located, or two ends of the arc-shaped structural member 16 can be inserted into a slot 34 formed on the base 36 where on the lifting mechanism 22 is located (so as to constrain the bending state of the arc-shaped structural member 16), as shown in FIG. 8.

Besides, the relay lens 20 can be optionally disposed on the detection point P, and the backlight plate 24 can be disposed on a position of the arc-shaped structural member 16 opposite to the camera lens 14. The operation processor 26 can be electrically connected with the camera lens 14 in a wired manner or in a wireless manner. In the embodiment of the present invention, the camera lens 14 can acquire the captured image I1 that contains the plurality of identification patterns 28 through the relay lens 20 disposed on the detection point P, which means the resolution detection device 10 can be applied for the camera device having the camera lens 14 and the relay lens 20. The relay lens 20 and the backlight plate 24 can be used to simulate a light source with a required object distance, so that the operation processor 26 can analyze the captured image I1 and find out the plurality of identification patterns 28 in the captured image I1 via the triangulation technology, and further utilize a boundary of each of the plurality of identification patterns 28 to compute its spatial frequency response value and acquire the lens resolution. Utilization of the boundary of each identification pattern 28 can be interpreted as marking the boundary of the identification pattern 28 by a bounding box for analysis and computation; however, a practical application is not limited to the foresaid embodiment. In other possible embodiment, the resolution detection device 10 can be applied for the camera device having the camera lens 14; the camera lens 14 in the specific embodiment can be disposed on a long range detection point in accordance with related optical parameters of the resolution detection device 10. A distance between the long range detection point and the arc-shaped structural member 16 can be greater than a distance between the camera lens 14 and the arc-shaped structural member 16, as shown in FIG. 2.

In the embodiment, the operation processor 26 can utilize graphic recognition technology (such as feature extraction and selection, and template matching) to search and position the plurality of identification patterns 28 in the captured image I1, and then mark the boundary of each identification pattern 28. The boundary of the identification pattern 28 and background color of the captured image I1 can be shown as black and white oblique edges, and related pixel distribution (such as black and grey and white pixels) can be imaged in the lens for computing a value of spatial frequency response (SPF) and a related curve of modulation transfer function (MTF) via mathematical model such as oversampling, differentiation and Fourier transform. The MTF curve can be used to evaluate the resolution of the camera lens 14.

The lifting mechanism 22 can be an optional element, and used to adjust a relative interval between the camera lens 14 and the arc-shaped structural member 16. The lifting mechanism 22A can be disposed on the holder 12, and the holder 12 can be moved to adjust a distance of the arc-shaped structural member 16 relative to the camera lens 14, as shown in FIG. 2. Further, the lifting mechanism 22B can be disposed on the camera lens 14, and the camera lens 14 can be moved to adjust a distance of the camera lens 14 relative to the arc-shaped structural member 16, as shown in FIG. 9. Moreover, the resolution detection device 10 can include the lifting mechanism 22A and the lifting mechanism 22B respectively disposed on the arc-shaped structural member 16 and the camera lens 14 to adjust the relative interval, as shown in FIG. 10. In another embodiment, the lifting mechanism 22C can be disposed on the relay lens 20 and used to adjust the relative interval between the relay lens 20 and the camera lens 14, as shown in FIG. 8. In detection process of the lens resolution, several camera lenses 14 can be sequentially moved to position aligning with and close to the detection point P for related detection, and the lifting mechanism 22 can prevent the camera lens 14 from damage due to hitting the resolution detection device 10 during disassembly and replacement process.

The arc-shaped structural member 16 can include a first section 30 and a second section 32 connected to each other. The plurality of identification patterns 28 can be distributed inside the first section 30 in accordance with a preset rule. The second section 32 can be fixed onto the holder 12 and set as a bearing base. The first section 30 can be set at a predefined angle relative to the second section 32, and used to ensure the arc-shaped structural member 16 can be disposed on the holder 12 correctly. The plurality of intervals of the plurality of identification patterns 28 relative to the detection point P can be respectively set as the predefined distance D1. In the embodiment, the predefined angle can be defined as one hundred and fifty-five degrees, which can depend on a design demand. Generally, a wide angle image captured by the camera lens 14 may have distortion error, and an included angle of boundaries of the identification pattern 28 shown in the captured image I1 through the camera lens 14 can be changed accordingly, which results in an inaccurate computation result; therefore, the resolution detection device 10 of the present invention can utilize an arc structure of the first section 30 of the arc-shaped structural member 16 to calibrate the distortion error, and the arc structure can be deformed in accordance with the optical parameters of the relay lens, so that the resolution detection device 10 can compute the correct resolution.

Figure 5:
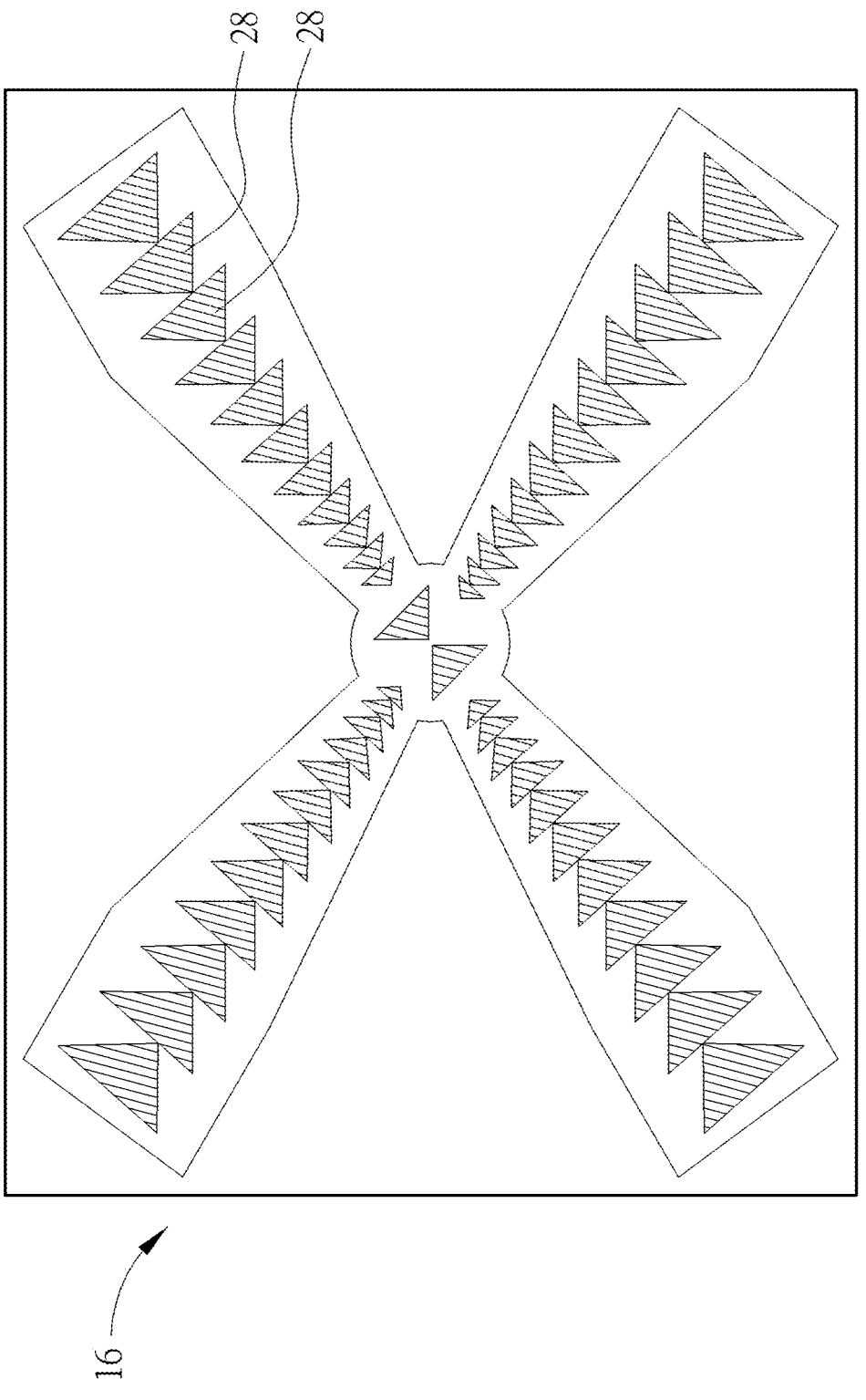
FIG. 5 is a diagram of an arc-shaped structural member according to another embodiment of the present invention.

Please refer to FIG. 1 and FIG. 5. FIG. 5 is a diagram of the arc-shaped structural member 16 according to another embodiment of the present invention. As shown in FIG. 1, the resolution detection device 10 can include two arc-shaped structural members 16 intersected with each other; an included angle of the two arc-shaped structural members 16 is not limited to any specific value, and any arc-shaped structural member 16 that includes the plurality of identification patterns 28 having the plurality of intervals relative to the detection point P respectively the same as the predefined distance D1 can conform to the design scope of the present invention. As shown in FIG. 5, the resolution detection device 10 can include the arc-shaped structural member 16 formed as an X-shaped structure; the arc-shaped structural member 16 formed as the X-shaped structure can include the plurality of identification patterns 28 having the plurality of intervals relative to the detection point P respectively the same as the predefined distance D1.

Figure 6:
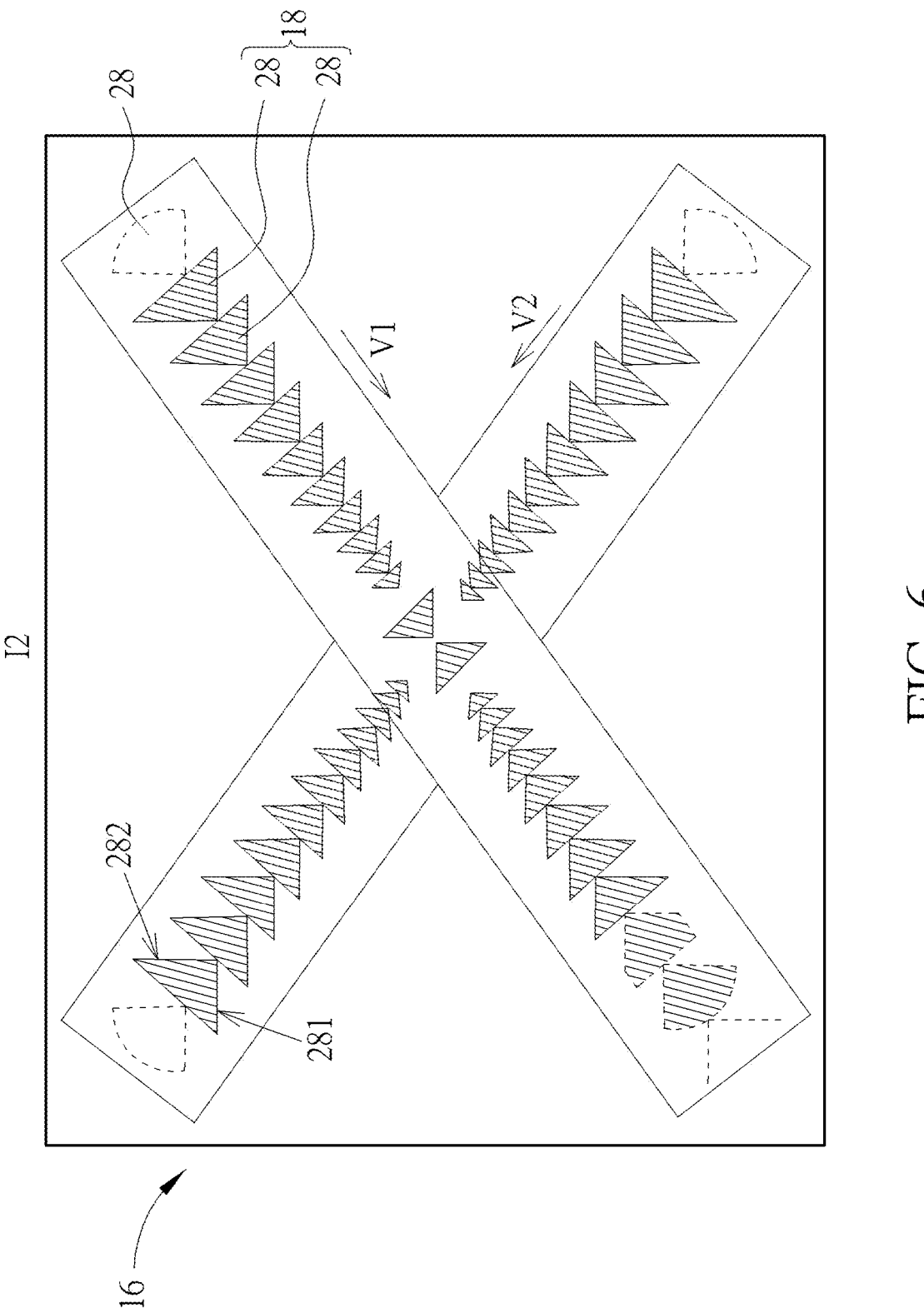
FIG. 6 is a diagram of an identification pattern according to the embodiment of the present invention.

Please refer to FIG. 6. FIG. 6 is a diagram of the identification pattern 28 according to the embodiment of the present invention. The identification pattern 28 can be a specific pattern that has lines substantially parallel to a horizontal edge and a vertical edge of the captured image I1. For example, the identification pattern 28 can at least include a first boundary 281 and a second boundary 282, and an angle difference between a right angle and an included angle formed between the first boundary 281 and the second boundary 282 can be smaller than a predefined value. The first boundary 281 can be substantially parallel to the horizontal edge of the captured image I1. The second boundary 282 can be substantially parallel to the vertical edge of the captured image I1. The included angle formed between the first boundary 281 and the second boundary 282 can be preferably equal to ninety degrees, which means the angle difference between the included angle and the right angle can be smaller than the predefined value. The predefined value can be set as being smaller than ten degrees, and an actual value of the predefined value can depend on the design demand. The identification pattern 28 can be one or a combination of two intersecting straight lines, a triangle, a polygon and a sector that have the right angle. Besides, the plurality of identification patterns 28 may be divided into two groups respectively and continuously arranged along the structurally longitudinal directions V1 and V2 of the arc-shaped structural member 16; the identification patterns 28 can be, but not limited to, arranged in a contacting manner or in a spaced manner.

Please refer to FIG. 2. The relay lens 20 can provide a maximal field of view FOV. The actual value of the maximal field of view FOV can be set in accordance with product standards and usage requirements, and a detailed description is omitted herein for simplicity. A minimal arc length L1 of the arc-shaped structural member 16 (or a minimal arc length of the first section 30) can be designed as a computation value of the maximal field of view FOV and the predefined distance D1, or can be defined as an arc length of a distributed range of all the identification patterns 28 formed on the arc-shaped structural member 16 (which may be slightly smaller than the arc length L1, such as a section of the arc length L1 that excludes two opposite ends of the arc length L1 located outside the maximal field of view FOV), so as to ensure the captured image I1 acquired by the camera lens 14 through the relay lens 20 can contain all the identification patterns 28 of the identification member 18 on the resolution detection device 10. In the embodiment, the arc length L1, the predefined distance D1 and the maximal field of view FOV can be computed by formula 1. In addition, a width L2 of the backlight plate 24 can be a computation value of the maximal field of view FOV of the relay lens 20 and an interval distance D2 of the backlight plate 24 relative to the relay lens 20, and can be computed by formula 2.

$$L1 = \frac{D1 * 2 * \pi * FOV}{360} \qquad \text{Formula 1}$$

$$L2 = D2 * 2 * \tan\left(\frac{FOV}{2}\right) \qquad \text{Formula 2}$$

Figure 7:
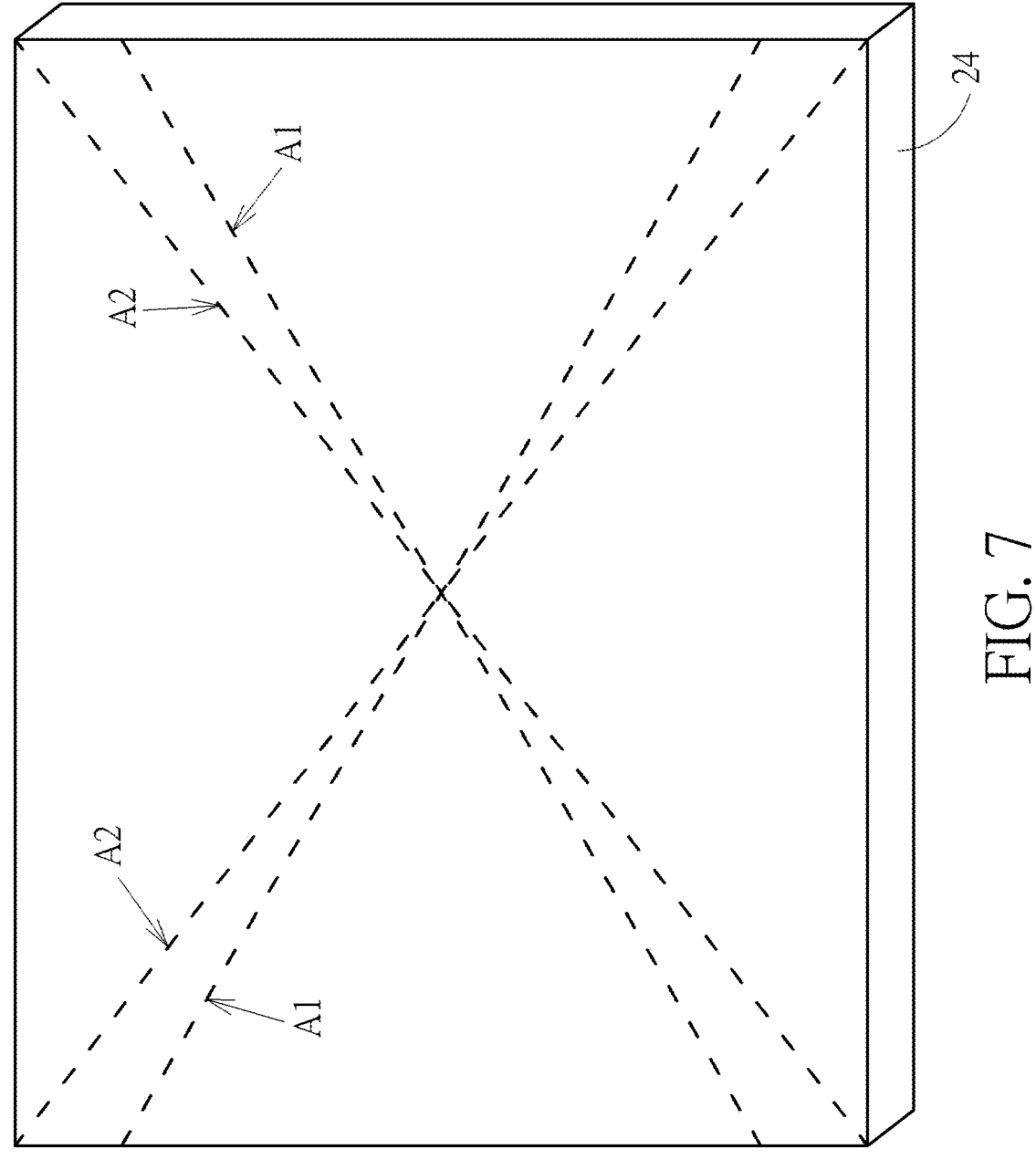
FIG. 7 is a diagram of the arc-shaped structural member and a backlight plate according to the embodiment of the present invention.

Please refer to FIG. 4 and FIG. 7. FIG. 7 is a diagram of the arc-shaped structural member 16 and the backlight plate 24 according to the embodiment of the present invention. As shown in FIG. 4, a solid frame can indicate a size of the captured image I1 with a wide aspect ratio (such as the aspect ratio 16:9), and a dashed frame can indicate a size of the captured image I1 with a standard aspect ratio (such as the aspect ratio 4:3). The arc-shaped structural member 16 shown in FIG. 7 can omit the identification member 18 and the identification patterns 28 for simplicity. Projection distribution of all the identification patterns 28 of the identification member 18 of the arc-shaped structural member 16 projected onto the backlight plate 24 can be similar to the distribution condition of the identification patterns 28 shown in FIG. 4, so that two opposite ends of the projected pattern 12 of the arc-shaped structural member 16 projected onto the backlight plate 24 can respectively correspond to two relative corners of the captured image I1, and a center point C2 of the projected pattern 12 can align with a center point C1 of the captured image I1; it should be mentioned that X-type distribution of the plurality of identification patterns 28 can be overlapped with two diagonal lines of the captured image I1.

For example, the backlight plate 24 can have a first auxiliary line A1 and a second auxiliary line A2. The first auxiliary line A1 can correspond to a first diagonal line A3 of the captured image I1 with the wide aspect ratio (such as the solid frame). The second auxiliary line A2 can correspond to a second diagonal line A4 of the captured image I1 with the standard aspect ratio (such as the dashed frame). The plurality of projection positions of the plurality of identification patterns 28 projected onto the backlight plate 24 can be overlapped with the first auxiliary line A1 and the second auxiliary line A2, and therefore the resolution detection device 10 can be suitable for the camera lens 14 with different types, so as to increase product versatility and market competition. In the embodiment, an included angle of a middle line of the first auxiliary line A1 and the second auxiliary line A2 relative to a horizontal center line of the backlight plate 24 can be preferably set as 29.1 degrees, and an actual value of the included angle is not limited to the above-mentioned embodiment.

In conclusion, when the camera lens needs to focus at the long range for computing the lens resolution, the present invention can utilize the identification member and the identification patterns with the arc-shaped structural member of the resolution detection device to acquire the correct lens resolution, and further can simulate the environment of the required object distance via the relay lens and the backlight plate. Moreover, the arc-shaped structural member can be made by flexible transparent material, and can be bent to the related arc shape in accordance with the optical parameters of the relay lens, so as to ensure the intervals between all sections of the arc-shaped structural member and the relay lens are the same and equal to the predefined distance, and further to eliminate the distortion error and prevent the boundary of the identification pattern from bending or deformed compression, for computation of the correct lens resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A resolution detection device applied to a camera device, the resolution detection device comprising:

at least one arc-shaped structural member, position of the at least one arc-shaped structural member reaching a predefined distance relative to a detection point; and an identification member formed on the at least one arc-shaped structural member and comprising a plurality of identification patterns, a plurality of intervals respectively between the plurality of identification patterns and the detection point being equal to the predefined distance;

wherein the camera device acquires a captured image through the detection point, and the captured image contains at least parts of the plurality of identification patterns;

wherein the resolution detection device further comprises an operation processor electrically connected with the camera device, and adapted to search the plurality of identification patterns in the captured image of the camera device via triangulation technology and further utilize boundaries of the plurality of identification patterns to compute a spatial frequency response value.

2. The resolution detection device of claim 1, wherein the camera device is assembly comprising a relay lens disposed on the detection point and a camera lens disposed adjacent to the relay lens, or the camera lens disposed on a long range detection point.

3. The resolution detection device of claim 1, wherein each of the plurality of identification patterns at least comprises a first boundary and a second boundary, an angle difference between a right angle and an included angle between the first boundary and the second boundary is smaller than a predefined value.

4. The resolution detection device of claim 1, wherein each of the plurality of identification patterns is one or a combination of two intersecting straight lines, a triangle, a polygon and a sector that have a right angle.

5. The resolution detection device of claim 1, wherein the plurality of identification patterns is continuously arranged in a structurally longitudinal direction of the arc-shaped structural member.

6. The resolution detection device of claim 2, wherein an arc length formed by a distribution range of the plurality of identification patterns on the arc-shaped structural member is a computation value of the predefined distance and a maximal field of view of the relay lens.

7. The resolution detection device of claim 1, wherein the at least one arc-shaped structural member comprises a first section and a second section connected with each other, the plurality of identification patterns is distributed on the first section, the second section is set at a predefined angle relative to the first section so as to fix a position of the at least one arc-shaped structural member relative to the camera device.

8. The resolution detection device of claim 1, wherein the at least one arc-shaped structural member is an X-shaped structure, or the resolution detection device comprises two arc-shaped structural members intersected with each other.

9. The resolution detection device of claim 2, wherein the resolution detection device further comprises a backlight plate disposed on a position of the at least one arc-shaped structural member relative to the camera device.

10. The resolution detection device of claim 9, wherein a width of the backlight plate is a computation value of a maximal field of view of the relay lens and an interval distance between the backlight plate and the relay lens.

11. The resolution detection device of claim 9, wherein two ends of a projected pattern of the at least one arc-shaped structural member projected onto the backlight plate respectively correspond to two relative corners of the captured image of the camera device, and a center point of the projected pattern aligns with a center point of the captured image.

12. The resolution detection device of claim 9, wherein a first auxiliary line of the backlight plate corresponds to a first diagonal line of the captured image with a wide aspect ratio, a second auxiliary line of the backlight plate corresponds to a second diagonal line of the captured image with a standard aspect ratio, a plurality of projection positions of the plurality of identification patterns projected onto the backlight plate is overlapped with the first auxiliary line and the second auxiliary line.

13. The resolution detection device of claim 1, wherein the plurality of identification patterns is formed on the identification member in a non-overlapped manner or in a partly overlapped manner.

14. The resolution detection device of claim 1, wherein the at least one arc-shaped structural member is disposed on a holder whereon the resolution detection device is installed.

15. A resolution detection device applied to a camera device, the resolution detection device comprising:

at least one arc-shaped structural member, position of the at least one arc-shaped structural member reaching a predefined distance relative to a detection point; and an identification member formed on the at least one arc-shaped structural member and comprising a plurality of identification patterns, a plurality of intervals respectively between the plurality of identification patterns and the detection point being equal to the predefined distance;

wherein the camera device acquires a captured image through the detection point, and the captured image contains at least parts of the plurality of identification patterns;

wherein the camera device is assembly comprising a relay lens disposed on the detection point and a camera lens disposed adjacent to the relay lens, or the camera lens disposed on a long range detection point;

wherein an arc length formed by a distribution range of the plurality of identification patterns on the arc-shaped structural member is a computation value of the predefined distance and a maximal field of view of the relay lens.

16. A resolution detection device applied to a camera device, the resolution detection device comprising:

at least one arc-shaped structural member, position of the at least one arc-shaped structural member reaching a predefined distance relative to a detection point; and an identification member formed on the at least one arc-shaped structural member and comprising a plurality of identification patterns, a plurality of intervals respectively between the plurality of identification patterns and the detection point being equal to the predefined distance;

wherein the camera device acquires a captured image through the detection point, and the captured image contains at least parts of the plurality of identification patterns;

wherein the camera device is assembly comprising a relay lens disposed on the detection point and a camera lens disposed adjacent to the relay lens, or the camera lens disposed on a long range detection point wherein the resolution detection device further comprises a backlight plate disposed on a position of the at least one arc-shaped structural member relative to the camera device;

wherein a width of the backlight plate is a computation value of a maximal field of view of the relay lens and an interval distance between the backlight plate and the relay lens.

\* \* \* \* \*